United States Patent
Aoki et al.

(10) Patent No.: US 8,228,662 B2
(45) Date of Patent: Jul. 24, 2012

(54) FEEDTHROUGH CAPACITOR WITH SIGNAL INTERNAL ELECTRODE LAYERS AND GROUND INTERNAL ELECTRODE LAYERS ALTERNATELY ARRANGED

(75) Inventors: Takashi Aoki, Tokyo (JP); Kenya Tamaki, Tokyo (JP)

(73) Assignee: TDK Corporation, Tokyo (JP)

( * ) Notice: Subject to any disclaimer, the term of this patent is extended or adjusted under 35 U.S.C. 154(b) by 610 days.

(21) Appl. No.: 12/172,776

(22) Filed: Jul. 14, 2008

(65) Prior Publication Data

US 2009/0034152 A1 Feb. 5, 2009

(30) Foreign Application Priority Data

Aug. 2, 2007 (JP) .................... 2007-202159

(51) Int. Cl.
*H01G 4/005* (2006.01)
*H01G 4/35* (2006.01)
*H01G 4/06* (2006.01)

(52) U.S. Cl. ............... 361/303; 361/302; 361/321.2
(58) Field of Classification Search .............. 361/303, 361/321.2, 302
See application file for complete search history.

(56) References Cited

U.S. PATENT DOCUMENTS

| | | | | |
|---|---|---|---|---|
| 6,922,329 B2 * | 7/2005 | Togashi | ............. | 361/309 |
| 7,567,151 B2 * | 7/2009 | Togashi | ............. | 333/172 |
| 7,619,873 B2 * | 11/2009 | Togashi | ............. | 361/306.3 |
| 2006/0279903 A1 * | 12/2006 | Togashi et al. | ............. | 361/303 |
| 2008/0253059 A1 * | 10/2008 | Eggerding et al. | ............. | 361/301.4 |

FOREIGN PATENT DOCUMENTS

| JP | A-6-224001 | | | 8/1994 |
|---|---|---|---|---|
| JP | 07201655 A | * | | 8/1995 |
| JP | A-09-055335 | | | 2/1997 |
| JP | A-09-312237 | | | 12/1997 |
| JP | 2003100552 A | * | | 4/2003 |
| JP | A-2004-273917 | | | 9/2004 |
| JP | A-2004-356293 | | | 12/2004 |
| JP | 2005032900 A | * | | 2/2005 |
| JP | A-2005-44871 | | | 2/2005 |
| JP | 2006100451 A | * | | 4/2006 |
| JP | 2006237234 A | * | | 9/2006 |

* cited by examiner

*Primary Examiner* — David M Sinclair
(74) *Attorney, Agent, or Firm* — Oliff & Berridge, PLC (57) ABSTRACT

In a feedthrough capacitor, a signal internal electrode layer is so arranged that an opposed portion opposed to a ground internal electrode layer is provided with a projection projecting toward a ground electrode, when viewed from a direction of a stack of dielectric layers. Therefore, if a gap amount G is abnormal between an end face with the ground electrode thereon and the signal internal electrode layer, the projection comes in contact with the ground electrode and a short circuit occurs between the ground electrode and terminal electrodes. This feedthrough capacitor thus permits easy detection of abnormality of the gap amount G, based on the presence/absence of a short-circuit failure.

12 Claims, 9 Drawing Sheets

FEEDTHROUGH CAPACITOR WITH SIGNAL INTERNAL ELECTRODE LAYERS AND GROUND INTERNAL ELECTRODE LAYERS ALTERNATELY ARRANGED

BACKGROUND OF THE INVENTION

1. Field of the Invention

The present invention relates to a feedthrough capacitor and a method for producing the feedthrough capacitor.

2. Related Background Art

In general, a feedthrough capacitor is provided with signal internal electrode layers and ground internal electrode layers alternately arranged in a capacitor element body. The signal internal electrode layers and the ground internal electrode layers exist so as to penetrate the interior of the capacitor element body, and connect terminal electrodes and ground electrodes arranged so as to be opposed to each other on the end faces of the capacitor element body. An example of the feedthrough capacitor of this type is the one described in Japanese Patent Application Laid-open No. 9-55335. This conventional feedthrough capacitor has a structure in which at least three ground internal electrode layers are laid between the signal internal electrode layers.

Incidentally, it is important in the feedthrough capacitor that a gap amount between the ends of the signal internal electrode layers in a direction intersecting with the direction of penetration thereof, and the exterior surface of the capacitor element body be maintained at an appropriate value. If this gap amount is insufficient, for example, in a case where the terminal electrodes and others are formed on the end faces of the capacitor element body by a wet plating method, a plating solution could intrude into the signal internal electrode layers to degrade the reliability of the element. There is another possibility that a desired capacitance could not be achieved because of variation in the area of opposed portions where the signal internal electrode layers are opposed to each other, when viewed from the stack direction of the capacitor element body.

The multilayer electronic component described in Japanese Patent Application Laid-open No. 9-312237 is provided with projecting detection patterns in the lead portions of the internal electrodes, and whether the gap amount is abnormal or not is determined based on the shape of the detection patterns exposed in the capacitor element body after cut. However, since this technique is to determine whether the gap amount is abnormal or not, by observation of appearance of the capacitor, it has a problem that it becomes harder to discriminate an abnormal pattern from a normal pattern as the element becomes smaller.

SUMMARY OF THE INVENTION

The present invention has been accomplished in order to solve the above problem and an object of the present invention is to provide a feedthrough capacitor permitting easy determination on whether the gap is abnormal or not between the exterior surface of the capacitor element body and the signal internal electrode layers, and a method for producing the feedthrough capacitor.

In order to solve the above problem, a feedthrough capacitor according to the present invention is a feedthrough capacitor comprising: a capacitor element body consisting of a stack of dielectric layers; a signal internal electrode layer and a ground internal electrode layer alternately arranged in the capacitor element body; terminal electrodes disposed on respective first end faces opposed to each other in the capacitor element body and electrically connected to each other by the signal internal electrode layer; and ground electrodes disposed on respective second end faces opposed to each other in a direction different from an opposed direction of the first end faces in the capacitor element body and electrically connected to each other by the ground internal electrode layer; wherein the signal internal electrode layer has an opposed portion opposed to the ground internal electrode layer, when viewed from a direction of the stack of the dielectric layers, and lead portions lead from the opposed portion to the terminal electrodes; and wherein the opposed portion comprises a projection projecting toward the ground electrode.

In this feedthrough capacitor, the signal internal electrode layer is so arranged that the opposed portion opposed to the ground internal electrode layer, when viewed from the direction of the stack of the dielectric layers, comprises the projection projecting toward the ground electrode. For this reason, if the gap amount is abnormal between the second end face with the ground electrode thereon and the signal internal electrode layer, the projection will come into contact with the ground electrode to cause a short circuit between the ground electrode and the terminal electrode. Therefore, this feedthrough capacitor permits easy detection of abnormality of the gap amount, based on the presence/absence of a short-circuit failure.

The feedthrough capacitor is preferably arranged as follows: the ground internal electrode layer has an opposed portion opposed to the signal internal electrode layer, when viewed from the direction of the stack of the dielectric layers, and lead portions lead from the opposed portion to the ground electrodes, and a width of the projection is not more than a width of the lead portions of the ground internal electrode layer. When the width of the projection is set as small as possible, it is feasible to prevent unnecessary exposure of the projection in the second end face.

A production method of a feedthrough capacitor according to the present invention is a method for producing the feedthrough capacitor, the method comprising: a step of arraying electrode patterns corresponding to the signal internal electrode layer and the ground internal electrode layer in an orientation-aligned state of the projection on green sheets as precursors of the dielectric layers; a step of stacking the green sheets with the electrode patterns arrayed thereon, in a predetermined order to form a green laminate; a step of cutting the green laminate so as to separate the electrode patterns for respective chips; and a step of determining whether a gap amount from the signal internal electrode layer to the second end face is abnormal or not, for each chip.

In this production method of the feedthrough capacitor, if the gap amount is abnormal between the second end face with the ground electrode thereon and the signal internal electrode layer in the step of cutting the green laminate, the projection will come into contact with the ground electrode to cause a short circuit between the ground electrode and the terminal electrode. Therefore, this feedthrough capacitor permits easy detection of abnormality of the gap amount based on the presence/absence of a short-circuit failure.

The method is preferably arranged as follows: the method further comprises bringing energization probes into contact with the terminal electrode and the ground electrode, respectively, after formation of each of the terminal electrodes and the ground electrodes on the capacitor element body, wherein the step of determining whether the gap amount is abnormal or not is carried out based on whether a short circuit occurs between the terminal electrode and the ground electrode. This method permits easy execution of screening of the feedthrough capacitor even if the size of the feedthrough capacitor is made smaller, different from the case of executing the appearance check.

The feedthrough capacitor and the production method of the feedthrough capacitor according to the present invention permit easy determination on the presence/absence of gap abnormality between the exterior surface of the capacitor element body and the signal internal electrode layer.

DESCRIPTION OF THE PREFERRED EMBODIMENTS

The preferred embodiments of the feedthrough capacitor and the production method of the feedthrough capacitor according to the present invention will be described below in detail with reference to the drawings.

Figure 1:
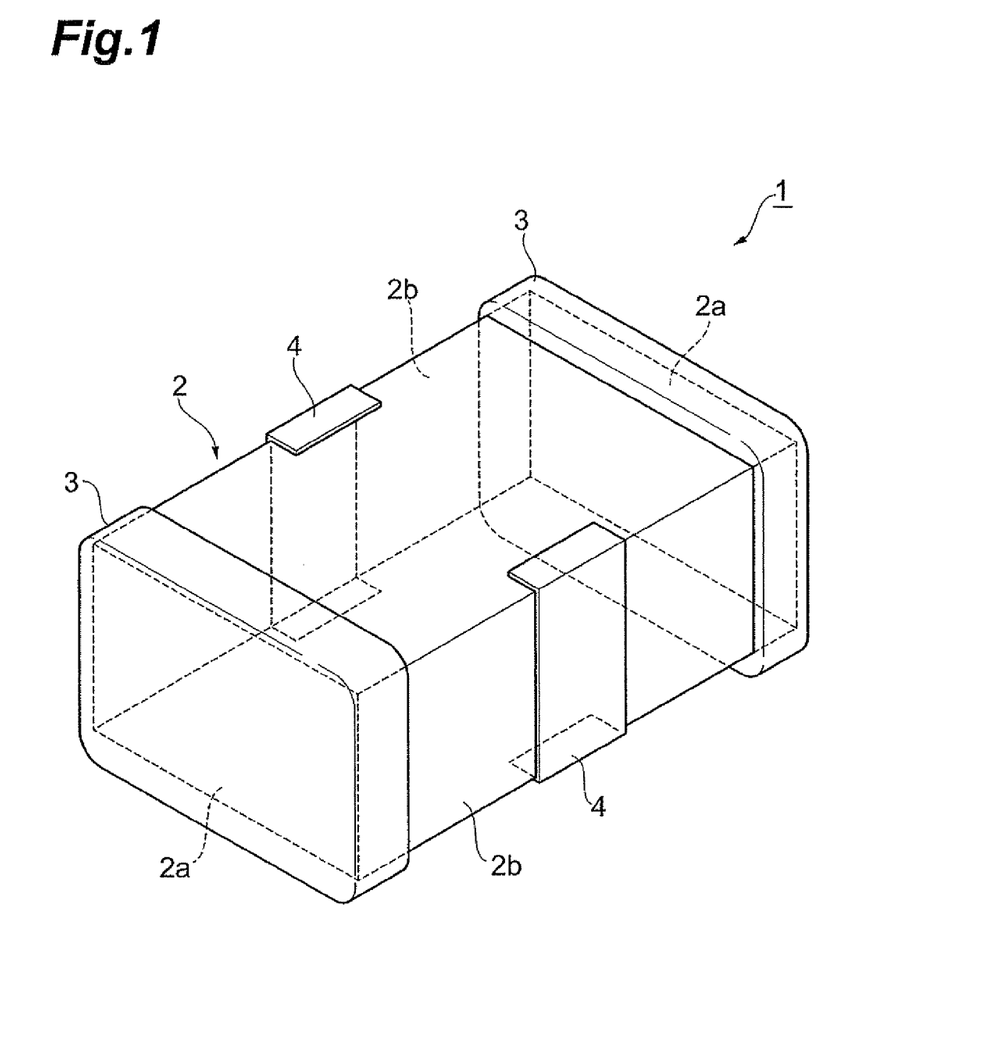
FIG. 1 is a perspective view of a feedthrough capacitor according to an embodiment of the present invention.
Figure 2:
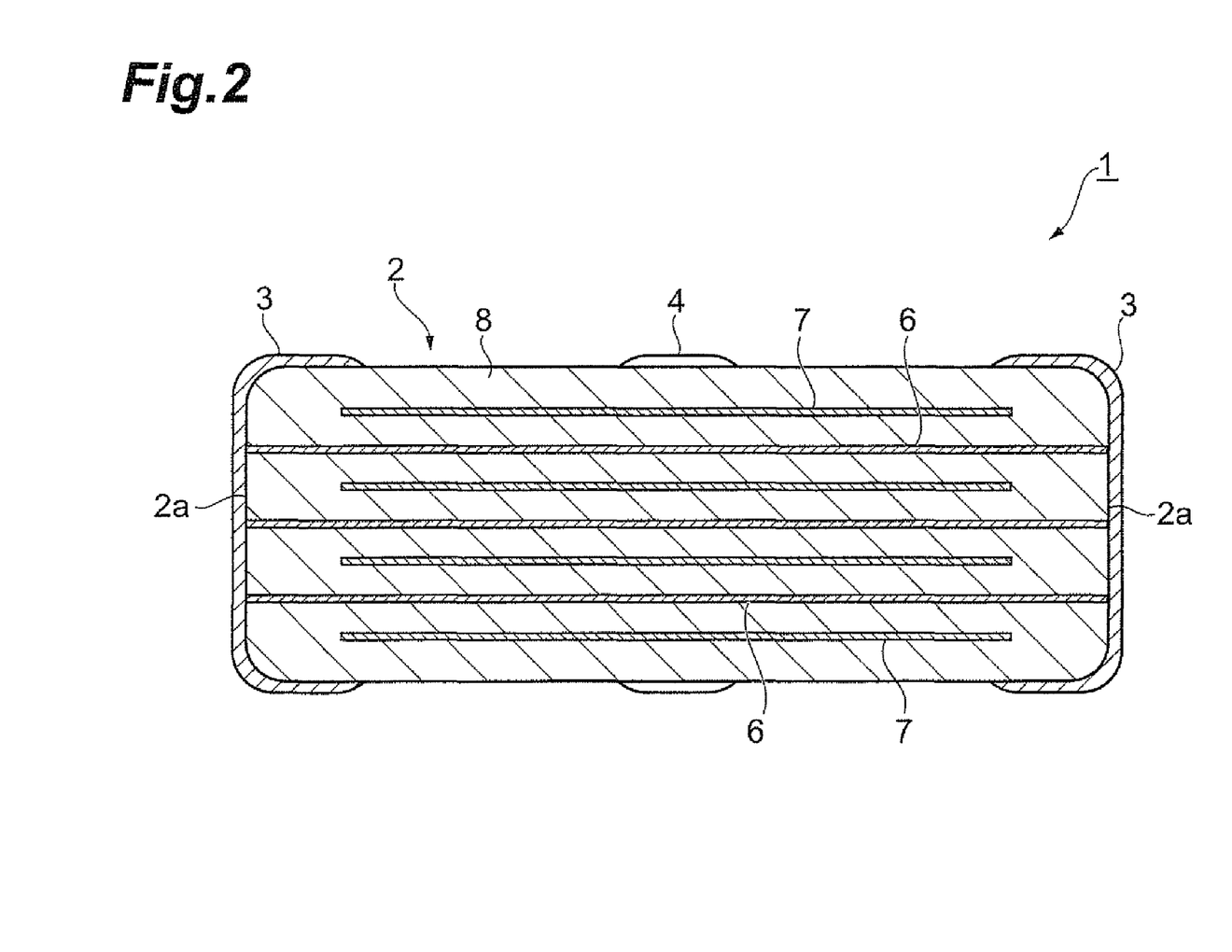
FIG. 2 is a sectional view showing a layer structure of the feedthrough capacitor shown in FIG. 1.

FIG. 1 is a perspective view of the feedthrough capacitor according to an embodiment of the present invention. FIG. 2 is a sectional view showing a layer structure of the feedthrough capacitor shown in FIG. 1. As shown in FIGS. 1 and 2, the feedthrough capacitor 1 is constructed with a capacitor element body 2, terminal electrodes 3, 3, ground electrodes 4, 4, signal internal electrode layers 6, and ground internal electrode layers 7.

The capacitor element body 2, as shown in FIG. 2, is composed of a stack of dielectric layers 8 and is of a nearly rectangular parallelepiped shape. The dielectric layers 8 are made of a dielectric material with an electrostrictive property, e.g., a $BaTiO_3$ type, $Ba(Ti,Zr)O_3$ type, or $(Ba,Ca)TiO_3$ type material.

The terminal electrodes 3, 3 are formed so as to cover longitudinal end faces (first end faces) 2a, 2a, respectively, in the capacitor element body 2 and are in a state in which they are opposed to each other. The terminal electrode 3 has a multilayered structure, in which an inside layer in contact with the capacitor element body 2 is made, for example, of Cu, Ni, Ag—Pd, or the like and in which an outside layer is, for example, a plated layer of Ni—Sn.

The ground electrodes 4, 4 are formed in nearly center regions of end faces (second end faces) 2b, 2b, respectively, perpendicular to the end faces 2a, 2a in the capacitor element body 2 and are in a state in which they are opposed to each other. The ground electrode 4 is made of a material similar to that of the terminal electrode 3 and has a multilayered structure. The ground electrode 4 is electrically isolated from the terminal electrode 3 on the surface of the capacitor element body 2.

The signal internal electrode layers 6 and the ground internal electrode layers 7 are alternately stacked so as to sandwich at least one dielectric layer 8 in the capacitor element body 2. The thickness of the dielectric layer 8 interposed between the signal internal electrode layer 6 and the ground internal electrode layer 7 is, for example, as thin as about 2-3 μm.

Figure 3:
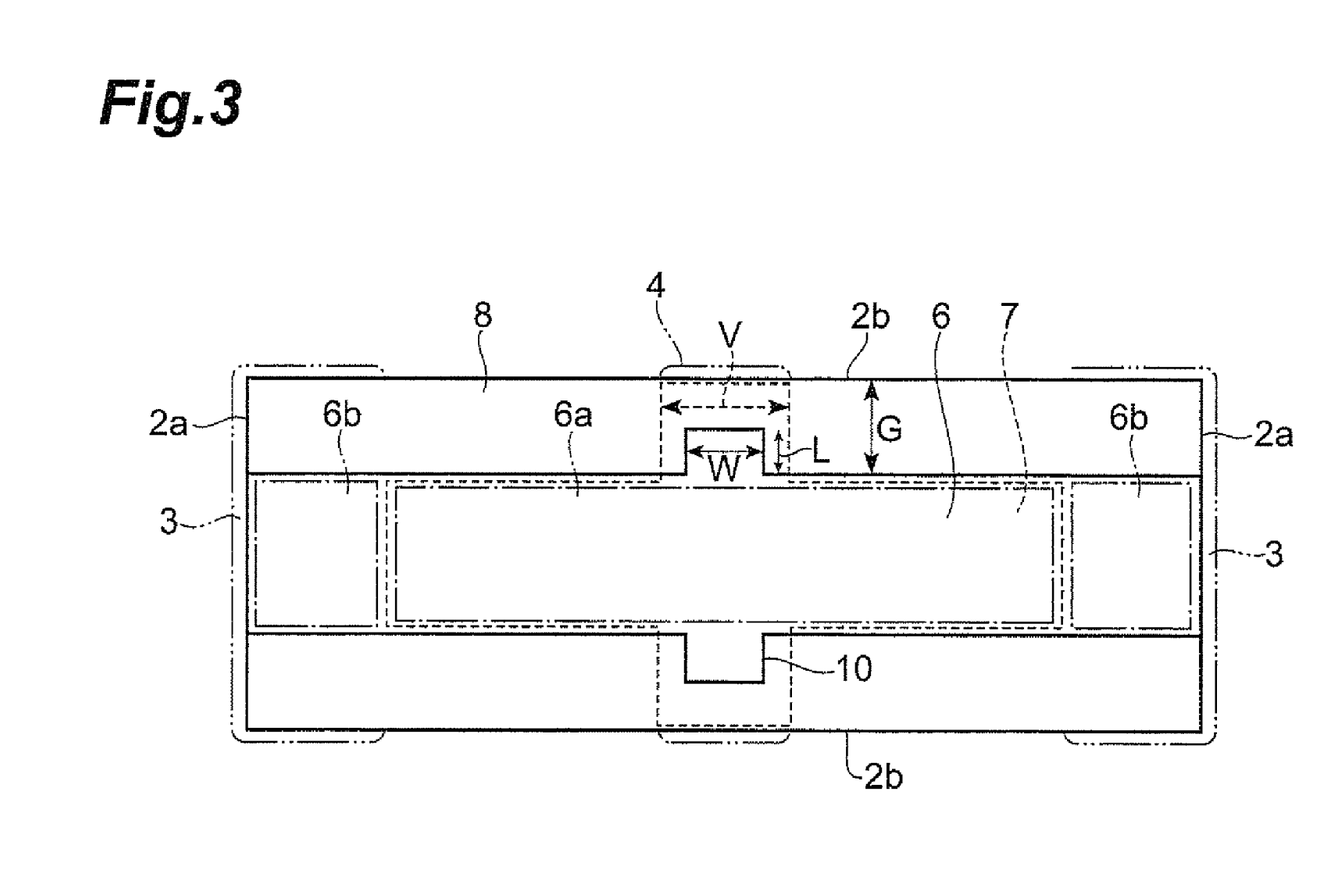
FIG. 3 is a plan view of a signal internal electrode layer.

Each signal internal electrode layer 6, as shown in FIG. 3, is formed in a nearly rectangular pattern when viewed from the direction of the stack of dielectric layers 8, and has an opposed portion 6a opposed to the ground internal electrode layer 7, and lead portions 6b lead from the opposed portion 6a to the respective terminal electrodes 3. In this configuration, the signal internal electrode layer 6 electrically connects the terminal electrodes 3, 3 formed on the respective end faces 2a, 2a, to each other.

The opposed portion 6a is provided with rectangular projections 10 projecting toward the respective ground electrodes 4, 4 formed on the end faces 2b, 2b. A projecting amount L of the projections 10 is set to be equal to a minimum limit in a permissible range of gap amount G, where the gap amount G is defined as a gap from the end face 2b, 2b to the opposed portion 6a. A width W of the projections 10 is set to be not more than a width V of lead portions 7b of the ground internal electrode layer 7.

Figure 4:
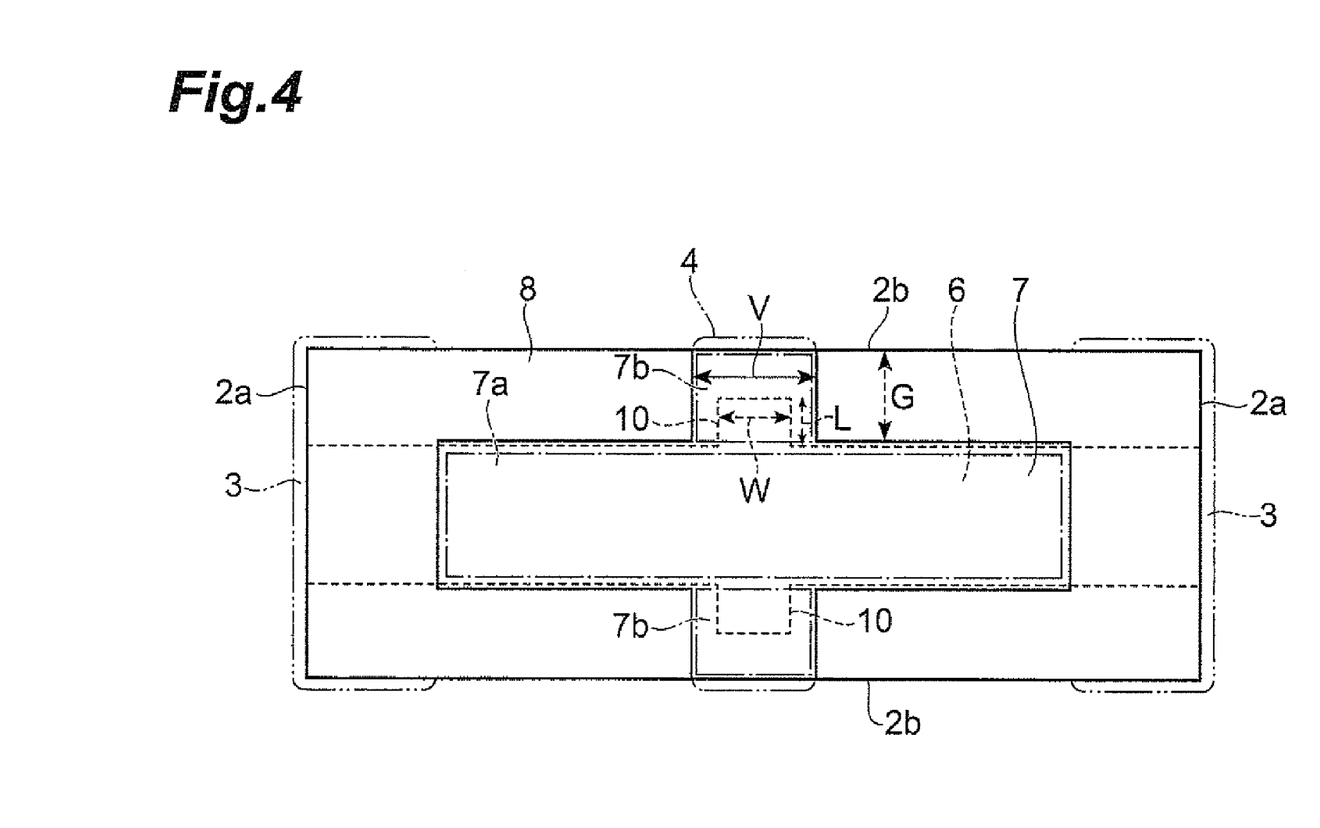
FIG. 4 is a plan view of a ground internal electrode layer.

Each ground internal electrode layer 7, as shown in FIG. 4, is formed in a nearly rectangular pattern when viewed from the direction of the stack of dielectric layers 8, and has an opposed portion 7a opposed to the signal internal electrode layer 6, and lead portions 7b lead from the opposed portion 7a to the respective ground electrodes 4. In this configuration, the ground internal electrode layer 7 electrically connects the ground electrodes 4, 4 formed on the respective end faces 2b, 2b, to each other. The width V of the lead portions 7b is approximately equal, for example, to the width of the ground electrodes 4.

The below will describe a method for producing the feedthrough capacitor 1 having the above-described configuration.

Figure 5:
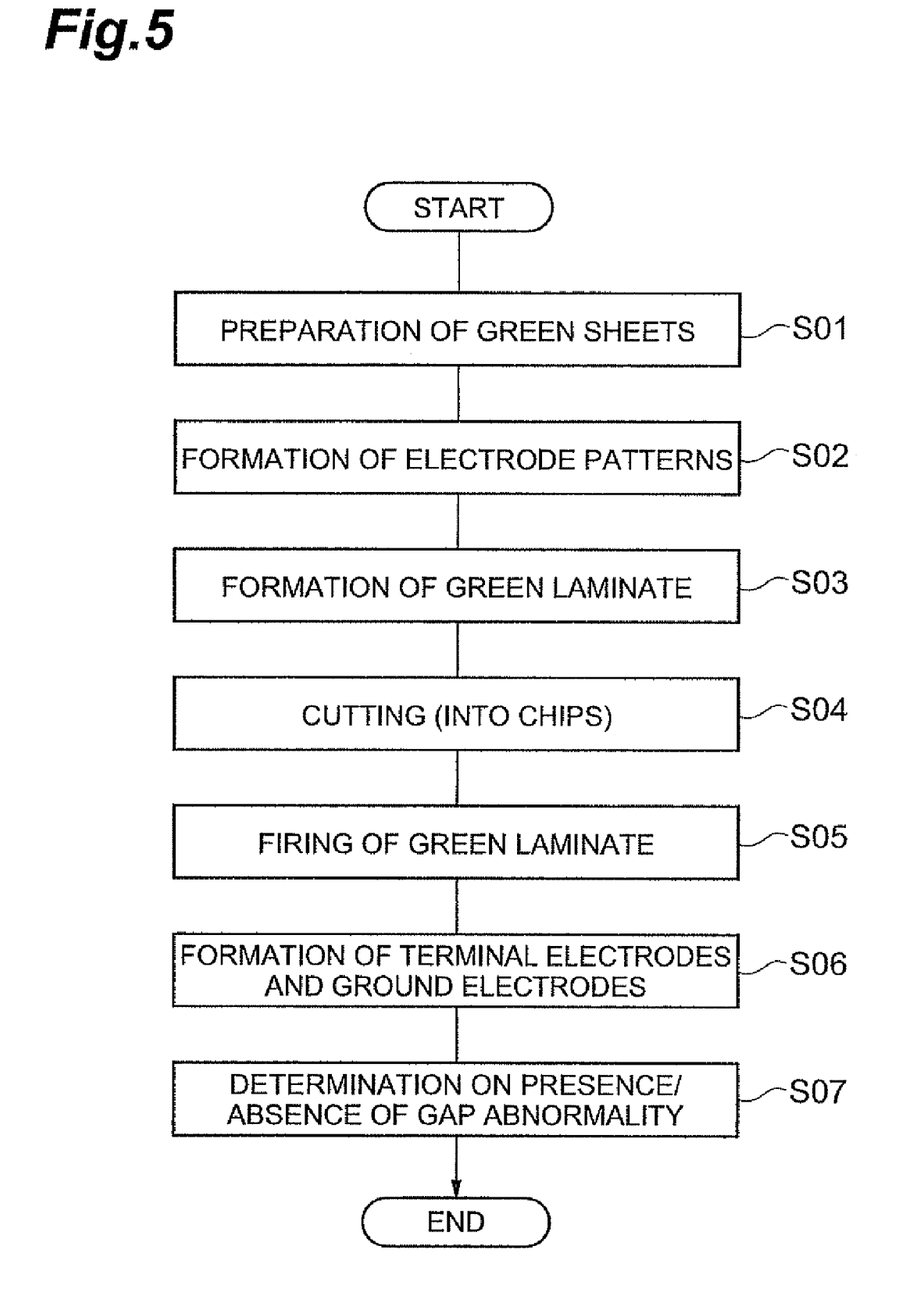
FIG. 5 is a flowchart showing steps of production of the feedthrough capacitor shown in FIG. 1.

FIG. 5 is a flowchart showing steps of production of the feedthrough capacitor 1. As shown in FIG. 5, the production of the feedthrough capacitor 1 first includes preparing a ceramic paste for forming the dielectric layers 8, and an internal electrode paste for forming the signal internal electrode layers 6 and the ground internal electrode layers 7.

The ceramic paste is obtained by mixing a raw material of the dielectric material forming the dielectric layers 8, with an organic vehicle and kneading the mixture. The raw material of the dielectric material can be, for example, a combination of oxides, carbonates, nitrates, hydroxides, organometallic compounds, etc. of metal atoms contained in a composite oxide such as a $BaTiO_3$ type, $Ba(Ti,Zr)O_3$ type, or $(Ba,Ca)TiO_3$ type oxide.

The organic vehicle contains a binder and a solvent. Examples of the binder include ethylcellulose, polyvinyl butyral, acrylic resin, and so on. Examples of the solvent include organic solvents such as terpineol, butylcarbitol, acetone, toluene, xylene, ethanol, methyl ethyl ketone, and so on. The internal electrode paste may optionally contain a plasticizer. Examples of the plasticizer applicable herein include phthalates such as benzyl butyl phthalate (BBP), adipic acid, phosphates, glycols, and so on.

After the preparation of the ceramic paste and the internal electrode paste described above, the ceramic paste is applied onto carrier sheets of PET or the like, for example, by the doctor blade method to produce a plurality of green sheets 11 (cf. FIG. 6) which are precursors of the dielectric layers 8 (step S01). Next, the internal electrode paste is printed on the green sheets 11, for example, by screen printing to form electrode patterns corresponding to the signal internal electrode layers 6 and the ground internal electrode layers 7 (step S02).

Then the green sheets 11 with the electrode patterns thereon are made in a predetermined size and stacked in a predetermined order, and they are then pressed in the stack direction to obtain a green laminate 12 (step S03). Then the green laminate 12 is cut into chips of a predetermined size with a cutting machine to obtain green chips (step S04).

Figure 6:
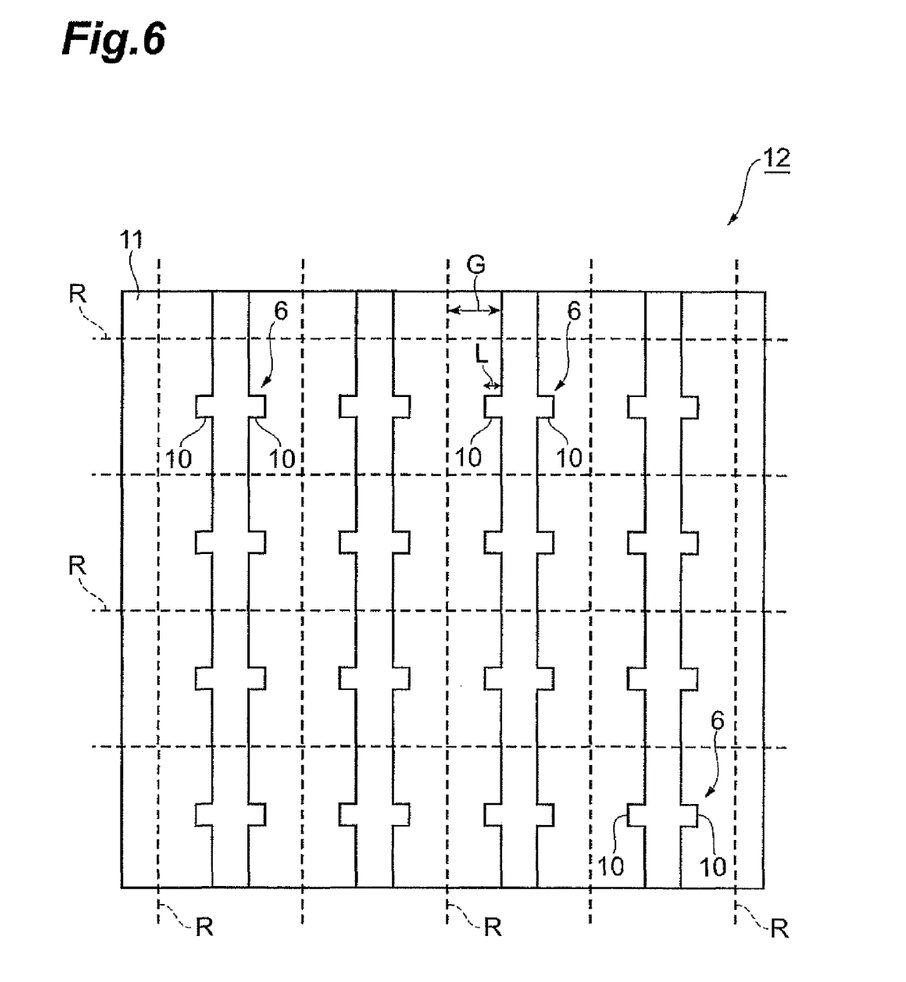
FIG. 6 is a drawing showing a state of an array of electrode patterns in a green laminate.

Before the cutting, the electrode patterns corresponding to the signal internal electrode layers 6 are arrayed in an orientation-aligned state of the projections 10, as shown in FIG. 6, on the green sheets 11. Cutting lines R are set at such positions that the gap amount G becomes larger than the projecting amount L of the projections, in each green chip.

Next, each green chip is subjected to a debindering process and thereafter the green chip is fired (step S05). This firing results in turning the green sheets into the dielectric layers 8 and turning the electrode patterns into the signal internal electrode layers 6 and the ground internal electrode layers 7, thereby obtaining the capacitor element body 2.

The debindering process is carried out by heating the green chip at about 200-600° C. in air or in a reducing atmosphere such as a mixed gas of $N_2$ and $H_2$. The firing is carried out by heating the green chip after the debindering process, for example, at about 1100-1300° C. in a reducing atmosphere. After the firing of the green chip, the resultant fired product is subjected to an annealing treatment at 800-1100° C. for about 2-10 hours according to need.

Subsequently, an electroconductive paste is applied onto the end faces 2a, 2a and the end faces 2b, 2b of the capacitor element body 2, then baked, and further plated, to form the terminal electrodes 3, 3 and the ground electrodes 4, 4 (step S06). The electroconductive paste applicable herein can be, for example, one obtained by mixing a glass frit and an organic vehicle in a metal powder consisting primarily of Cu.

The metal powder may be one containing Ni, Ag—Pd, or Ag as a major component. The plating used herein is metal plating of Ni, Sn, a Ni—Sn alloy, a Sn—Ag alloy, a Sn—Bi alloy, or the like. The metal plating may be, for example, a multilayer structure consisting of two or more layers of Ni and Sn. The above procedure yields a plurality of feedthrough capacitors 1 shown in FIGS. 1 and 2.

Figure 7:
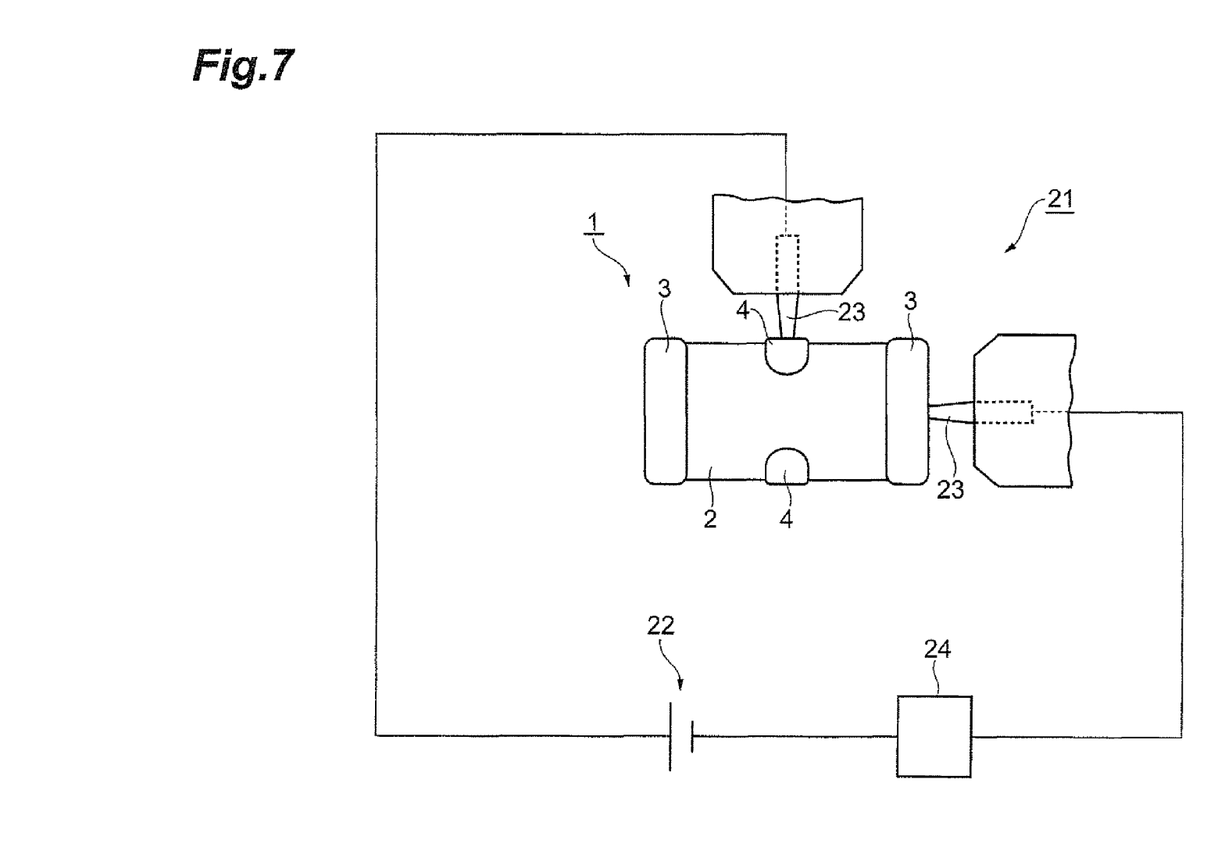
FIG. 7 is a drawing showing a schematic configuration of an inspection apparatus used in a gap amount determined step.

Finally, each feedthrough capacitor 1 obtained is subjected to screening of feedthrough capacitor 1 by determining whether the gap amount G from the end face 2b, 2b to the opposed portion 6a is abnormal (step S07). FIG. 7 is a drawing showing a schematic configuration of an inspection apparatus used in this gap amount determined step.

As shown in FIG. 7, the inspection apparatus 21 is constructed with a dc power supply 22, a pair of energization probes 23, 23 connected to the de power supply 22, and a measuring device 24. For the inspection, the energization probes 23, 23 are brought into contact with one terminal electrode 3 and one ground electrode 4, respectively, of the feedthrough capacitor 1 as an object to be inspected.

Figure 8:
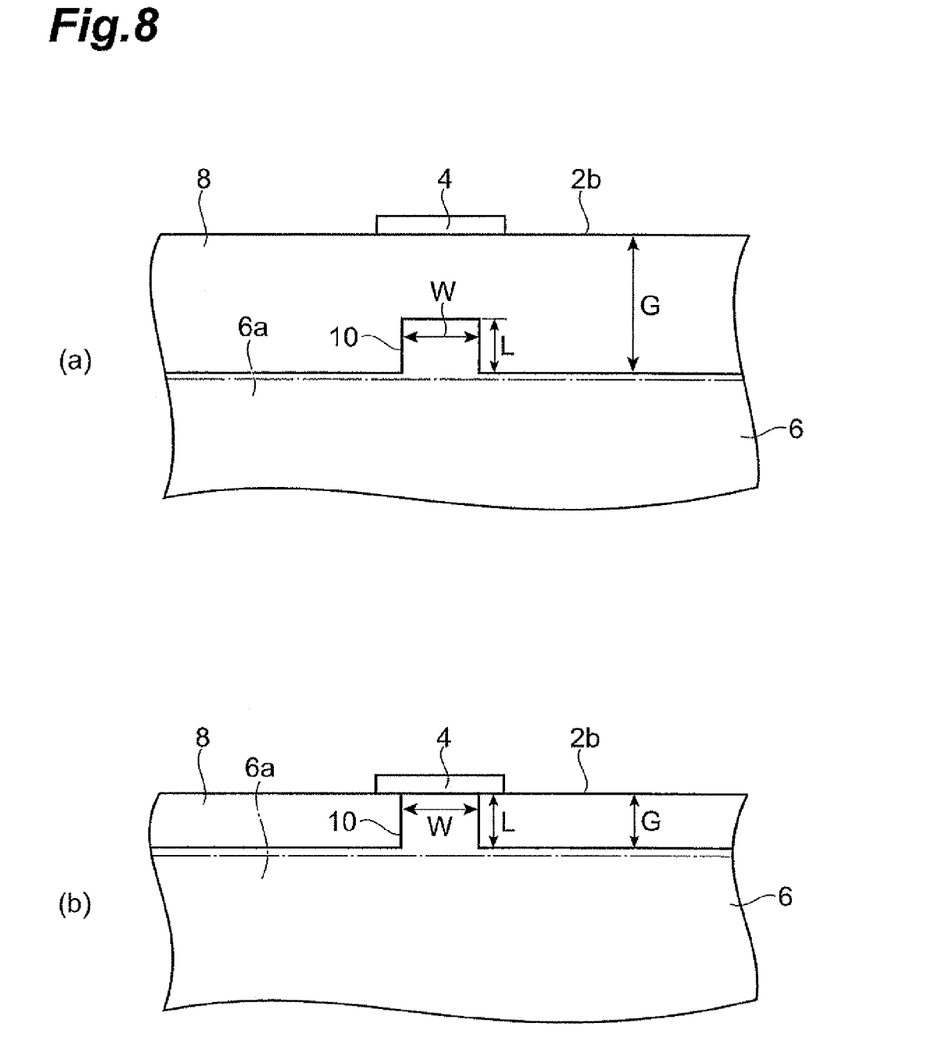
FIG. 8 is a drawing showing positional relations between a projection and a ground electrode in a case where a gap amount is normal and in a case where the gap amount is abnormal.

If the gap amount G from the end face 2b, 2b to the opposed portion 6a is within the permissible range, the tip of the projection 10 is separated from the ground electrode 4 in the capacitor element body 2, as shown in FIG. 8(a), and no electric current from the ground electrode 4 to the terminal electrode 3 is detected at the measuring device 24. In this case, the gap amount G of the feedthrough capacitor 1 is determined to be normal.

On the other hand, if the gap amount G is below the minimum limit of the permissible range, e.g., if a positional deviation occurs during the stacking process of green sheets 11 with the electrode patterns thereon in step S03, or if a cutting deviation occurs during the cutting process of the green laminate 12 in step S04, the tip of the projection 10 comes into contact with the ground electrode 4 in the capacitor element body 2, as shown in FIG. 8(b).

For this reason, a short circuit occurs between the ground electrode 4 and the terminal electrode 3 and a certain electric current flowing from the ground electrode 4 to the terminal electrode 3 is detected at the measuring device 24. In this case, the gap amount G of the feedthrough capacitor 1 is determined to be abnormal.

In the feedthrough capacitor 1, as described above, each signal internal electrode layer 6 is constructed in the structure in which the opposed portion 6a opposed to the ground internal electrode layer 7 is provided with the projections 10 projecting toward the respective ground electrodes 4, when viewed from the stack direction of the dielectric layers 8. For this reason, if the gap amount G is abnormal between the end face 2b, 2b with the ground electrode 4 thereon and the signal internal electrode layer 6, the projection 10 comes in contact with the ground electrode 4 and a short circuit occurs between the ground electrode 4 and the terminal electrode 3. Therefore, this feedthrough capacitor 1 permits easy detection of abnormality of the gap amount G, based on the presence/absence of a short-circuit failure.

This enables simple and certain elimination of defective elements in the gap amount determining step, e.g., an element which could cause a problem of reliability due to intrusion of a plating solution into the signal internal electrode layers 6, and an element which could fail to achieve a desired capacitance because of positional deviation of the signal internal electrode layers 6, irrespective of the size of the feedthrough capacitor 1.

In the feedthrough capacitor 1, the width W of the projections 10 is not more than the width V of the lead portions 7b of the ground internal electrode layers 7. Since the width W of the projections 10 is set as small as possible as described above, it is feasible to prevent unnecessary exposure of the projections 10 in the end faces 2b, 2b and to more securely suppress the intrusion of the plating solution into the signal internal electrode layers 6.

Figure 9:
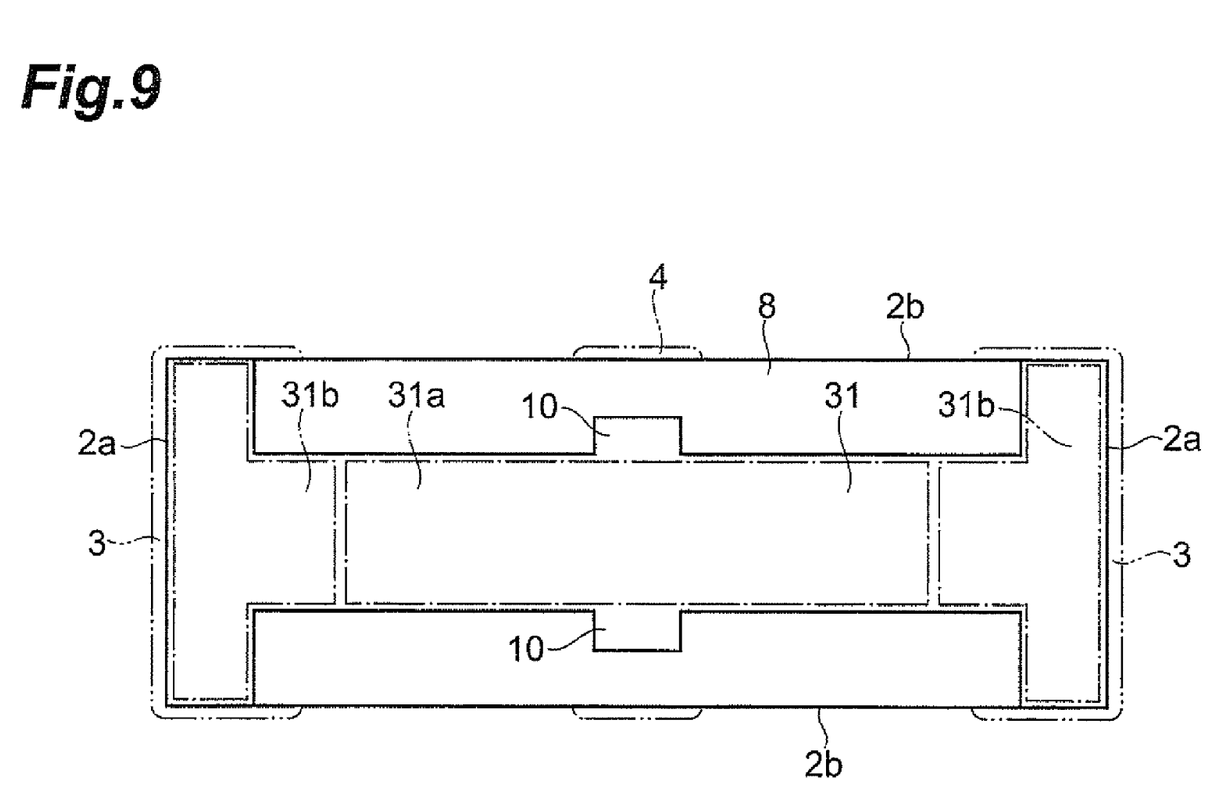
FIG. 9 is a drawing showing a modification example of the signal internal electrode layer.

The present invention is not limited to the above embodiments. For example, the above embodiment showed the example in which the width of the signal internal electrode layer 6 was constant except for the region where the projections 10 were formed, but it is also possible to expand the width of the two end portions of the lead portions 31b lead from the opposed portion 31a to the respective terminal electrodes 3, 3, as in the signal internal electrode layer 31 shown in FIG. 9. In this case, a sufficient contact area is secured between the signal internal electrode layer 31 and the terminal electrodes 3.

What is claimed is:
1. A feedthrough capacitor comprising:
a capacitor element body consisting of a stack of dielectric layers;
a signal internal electrode layer and a ground internal electrode layer alternately arranged in the capacitor element body;

terminal electrodes disposed on respective first end faces opposed to each other in the capacitor element body and electrically connected to each other by the signal internal electrode layer; and ground electrodes disposed on respective second end faces opposed to each other in a direction different from an opposed direction of the first end faces in the capacitor element body and electrically connected to each other by the ground internal electrode layer, wherein the ground internal electrode layer has a first opposed portion opposed to the signal internal electrode layer and formed in a rectangular pattern, when viewed from a direction of the stack of dielectric layers, and first lead portions lead from the first opposed portion to the ground electrodes, widths of the first lead portions of the ground internal electrode layer are smaller than a width of the first opposed portion of the ground internal electrode layer, the signal internal electrode layer has a second opposed portion opposed to the first opposed portion of the ground internal electrode layer, when viewed from the direction of the stack of dielectric layers, and second lead portions lead from the second opposed portion to the terminal electrodes, and projections projecting from the second opposed portion toward the ground electrodes and opposed to the first lead portions, when viewed from a direction of the stack of dielectric layers.

2. The feedthrough capacitor according to claim 1, wherein a widths of the projections are not more than a width of the first lead portions of the ground internal electrode layer.

3. The feedthrough capacitor according to claim 1, wherein a widths of the projections are not more than a width of the second opposed portion of the signal internal electrode layer.

4. The feedthrough capacitor according to claim 1, wherein the first lead portions of the ground internal electrode layer are lead to only the second end faces.

5. The feedthrough capacitor according to claim 4, wherein the ground electrodes are formed in nearly center regions of the second end faces.

6. The feedthrough capacitor according to claim 5, wherein the first lead portions of the ground internal electrode layer are lead to the nearly center regions of the second end faces.

7. The feedthrough capacitor according to claim 1, wherein the terminal electrodes are formed so as to cover all regions of the first end faces.

8. The feedthrough capacitor according to claim 7, wherein widths of the second lead portions of the signal internal electrode layer are expanded to the second end faces.

9. The feedthrough capacitor according to claim 8, wherein the terminal electrodes are formed so as to cover end regions of the second end faces.

10. The feedthrough capacitor according to claim 1, wherein widths of the second lead portions of the signal internal electrode layer are expanded on the sides of the respective terminal electrodes.

11. The feedthrough capacitor according to claim 1, wherein the second opposed portion of the signal internal electrode layer is formed in a rectangular pattern when viewed from the direction of the stack of dielectric layers, and the widths of the projections of the signal internal electrode layer are smaller than the width of the second opposed portion of the signal internal electrode layer.

12. The feedthrough capacitor according to claim 11, wherein the widths of the projections of the signal internal electrode layer are not more than a width of the first lead portions of the ground internal electrode layer.

* * * * *